(12) United States Patent
Langguth et al.

(10) Patent No.: US 10,020,898 B2
(45) Date of Patent: Jul. 10, 2018

(54) RADIO-DEVICE SYSTEM AND A METHOD WITH TIME-PARAMETER EVALUATION

(71) Applicant: Rohde & Schwarz GmbH & Co. KG, Munich (DE)

(72) Inventors: Torsten Langguth, Unterhaching (DE); Michael Ebersberger, Olching (DE); Rainer Storn, Kirchheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 14/628,192

(22) Filed: Feb. 20, 2015

(65) Prior Publication Data
US 2017/0244498 A1    Aug. 24, 2017

(30) Foreign Application Priority Data
Feb. 20, 2014   (DE) .................. 10 2014 203 095

(51) Int. Cl.
H04L 12/26       (2006.01)
H04B 17/00       (2015.01)
H04W 24/04       (2009.01)

(52) U.S. Cl.
CPC ............ *H04B 17/00* (2013.01); *H04W 24/04* (2013.01)

(58) Field of Classification Search
CPC ......... H04B 17/00; H04B 1/74; H04W 24/04; H04W 12/12; H04L 9/002
USPC ........................................... 370/241
See application file for complete search history.

(56) References Cited

U.S. PATENT DOCUMENTS

| | | | | |
|---|---|---|---|---|
| 6,112,052 A | * | 8/2000 | Guthrie | H04K 3/42 455/1 |
| 6,205,550 B1 | * | 3/2001 | Nardone | G06F 12/1408 380/30 |
| 6,687,217 B1 | | 2/2004 | Chow et al. | |
| 2008/0104704 A1 | * | 5/2008 | Mohandas | G06F 21/52 726/26 |
| 2008/0175141 A1 | | 7/2008 | Nguyen et al. | |
| 2012/0026869 A1 | * | 2/2012 | Wang | H04L 41/5003 370/230 |
| 2012/0250610 A1 | * | 10/2012 | Budampati | H04L 67/125 370/328 |
| 2014/0266705 A1 | * | 9/2014 | McKinley | G08B 25/10 340/539.13 |

FOREIGN PATENT DOCUMENTS

| | | | |
|---|---|---|---|
| DE | 102004052787 A1 | 5/2006 | |
| DE | 102007033914 | * 12/2008 | ........... H04B 1/0053 |
| DE | 102007033914 A1 | 12/2008 | |
| GB | 2421661 A | 6/2006 | |
| WO | WO 0176125 A2 | * 10/2001 | ............ H04W 12/04 |

* cited by examiner

Primary Examiner — Rebecca E Song
(74) Attorney, Agent, or Firm — Potomac Technology Law, LLC

(57) ABSTRACT

A radio-device system with a monitoring unit is provided, wherein the monitoring unit is connected to a main-radio device and to an emergency-radio device. By means of a control signal of the monitoring unit, an antenna is connected either with the main-radio device or with the emergency-radio device. The monitoring unit is fitted with a time-evaluation unit, which evaluates the processing of the command with regard to a time parameter. Furthermore, a method is also provided for monitoring the implementation of a command of the main-radio device within the radio-device system.

15 Claims, 3 Drawing Sheets

RADIO-DEVICE SYSTEM AND A METHOD WITH TIME-PARAMETER EVALUATION

PRIORITY

This application claims priority of German Patent Application No 10 2014 203 095.1, filed Feb. 20, 2014.

FIELD OF THE INVENTION

The invention relates to a radio-device system with an emergency function. The radio-device system is provided especially for aviation. The invention further relates to a method for monitoring the implementation of a command of a main-radio device within the radio-device system.

BACKGROUND OF THE INVENTION

DE 10 2007 033 914 A1 describes a radio-device system with a monitoring unit, wherein the monitoring unit is connected to a main-radio device and an emergency-radio device. The status of the main-radio device is evaluated in the monitoring unit. In this context, the monitoring unit analyses commands which are sent to the main-radio device. Checks are carried out to determine whether the command brings about the required change to the status of the main-radio device.

It is sometimes necessary to register a time reference between the receipt of the command in the main-radio device and the changed status of the main-radio device. In particular, this is necessary for the identification of attacks on the main-radio device in order to detect and prevent unauthorized accesses to the main-radio device, for example, with regard to spying on cryptographic keys or depositing false messages. Furthermore, the time reference between the receipt of the command and the change in status of the main-radio device must be monitored in order to check whether specifications for a radio traffic, for example, in accordance with a standard or technical specifications, have been observed or to check internal time specifications for a status change of the main-radio device, so that inferences can be drawn regarding the functional capability of the main-radio device.

What is needed, therefore, is an approach for a radio-device system and a method, in which full functional capability, any error behavior and/or attempted manipulation of the main-radio device can be readily detected.

SUMMARY OF THE INVENTION

Embodiments of the present invention advantageously address the foregoing requirements and needs, as well as others, by providing a radio-device system and a method, in which full functional capability, any error behavior and/or attempted manipulation of the main-radio device can be readily detected.

In accordance with an example embodiment of the invention, a radio-device system is provided, which comprises two types of radio device, a main-radio device as a first type and an emergency-radio device as a second type. Furthermore, a monitoring unit which connects an antenna of the radio-device system either to the main-radio device or to the emergency-radio device via a control signal is provided within the radio-device system. The monitoring unit monitors the commands for the main-radio device.

According to a further example embodiment of the invention, the monitoring unit further comprises a time-evaluation unit which evaluates the processing commands with regard to a time parameter. This has the technical effect that the time between depositing the command in the main-radio device and the end of the command processing is registered in time. If the time duration exceeds a predetermined time span, this is recognized by the monitoring unit and interpreted as an error of the main-radio device. For example, control instructions and status-change instructions for the main-radio device are understood as commands. These commands are transmitted either via the antenna or via a data interface to the main-radio device and processed by the latter.

On the one hand, internal instructions for the implementation and processing of commands in radio devices can be monitored with this radio-device system according to the invention. On the other hand, standardization specifications which are necessary for the correct operation of the radio-device system can also be monitored.

By way of example, the time parameter is a predefined time duration. The predefined time duration can be an internal specification, for example, 20 milliseconds. Alternatively, this time duration is a standardized time duration which may elapse maximally up to the time when the command has been implemented by the main-radio device.

By way of further example, the time parameter is the delay time of the command between a transmission of the command to the main-radio device and the end of the command processing by the main-radio device. In this context, the delay time is determined substantially by internal components of the main-radio device, especially, a processor, and the signal delay times on the lines within the main-radio device. The transmission of the command to the main-radio device is displayed to the monitoring unit, especially by means of a control signal.

By way of further example, the monitoring unit can be connected to the emergency-radio device if the result of the evaluation is that the time parameter has not been observed. For this purpose, an antenna switchover unit is provided which is controlled by the monitoring unit. For example, if a radio-silence command is transmitted as the command to the main-radio device, the radio-device system must not, according to the command, output any radio signals, but must continue to be set up to receive radio signals. Such radio-silence commands are provided, for example, in the military domain, in order not to betray the current position of the radio-device system. Radio-silence commands are also conceivable in the context of shipping traffic, for example, in order to allow weak radio signals to be received, for example, from ships in distress.

If the radio-silence command is transmitted to a main-radio device, it is ensured within a predefined time span that the main-radio device no longer transmits any radio signals. If however, after this predefined time span, a radio signal is still transmitted from the main-radio device, this will be evaluated by the monitoring unit as an error, and the antenna will be connected to the emergency-radio device.

By way of further example, the command is a key-deletion command. This command should be provided especially in the case of an encrypted communication of the main-radio device. For this purpose, a cryptographic key, by means of which the information to be communicated between the main-radio device and an external third-party is cryptographically encrypted, is provided in the main-radio device. These cryptographic keys are sought out preferentially by attackers in order to spy on the encrypted communication.

If an attack on the main-radio device is suspected, a key-deletion command is transmitted to the main-radio device in order to delete all cryptographic keys and/or sensitive data, especially identity data disposed in the main-radio device. If the deletion process commanded does not take place within a predefined time span, it is advantageously proposed that measures for the key deletion are initiated in the main-radio device by means of the monitoring unit. In particular, these measures are, the switching off of the power, because the keys are stored in a volatile storage region, or the re-transmission of the key-deletion command from the monitoring unit.

Alternatively, the command is a jamming command (jamming signal). In this context, a jamming transmitter, the so-called jammer, makes the correct reception of a radio message difficult or impossible. Accordingly, the jammer transmits radio waves and partially or completely superposes the original waves. The field strength, the modulation of the jammer and the type of the jammed message are therefore significant in this context. If the main-radio device transmits the jamming signal, it must be ensured that no damage to the main-radio device, especially no damage to the receiver input unit, occurs as a result of the transmission of the jamming signal.

Now, if a jamming command is transmitted to the main-radio device, the main-radio device generates the jamming signal and transmits it via an antenna. In this context, the jamming signal will run sequentially through a relatively large frequency range, which is referred to as sweeping. If the main-radio device transmits in a frequency range in which it can itself also receive and process radio waves, a damage or destruction of the input receiver unit would be caused by the transmitted jamming signal. In order to prevent this damage or destruction, it must be ensured that the receiver input unit of the main-radio device is deactivated at the time of the transmission of the jamming signal. If no deactivation of the input unit occurs from the time of receiving of the jamming signal, the emergency-radio device is automatically switched on and the main-radio device deactivated for self-protection.

According to one embodiment, the monitoring unit identifies a command falsification. In this context, provision is made in particular for the prevention of a command which has been manipulated by an attacker in order to bring about an unauthorized reaction of the main-radio device. This increases the security of the main-radio device and ensures functional capability.

According to a further embodiment, the monitoring unit identifies an unauthorized opening of the main-radio device, so-called tampering. Tampering occurs, especially if changes are made to the hardware of the radio-device system, in order to perform manipulations on the main-radio device. Such attacks can be prevented by the embodiment according to the invention of the radio-device system, thereby ensuring, especially, that cryptographic keys and/or sensitive data cannot be read out from a main-radio device.

In accordance with example embodiments, a method for monitoring the implementation of a command comprises the method steps: registration of a time parameter of a command processing by the main-radio device by means of the time-evaluation unit; identification of the non-observance of a predefined time duration; deactivation of the main-radio device; and activation of the emergency-radio device.

By way of example, the deactivation and activation comprise especially the provision of the readiness of the main-radio device and/or the emergency-radio device to receive and/or to transmit, which is suspended by the deactivation or respectively provided by the activation.

According to one embodiment, the monitoring unit starts the registration from the time of receiving a command in the main-radio device.

According to a further embodiment, the monitoring unit ends the registration from the time of the indication of the end of the command processing by the main-radio device.

By way of example, the monitoring unit detects the opening of the radio-device system, wherein, as a result, the main-radio device is automatically deactivated and the emergency-radio device is activated.

According to a further embodiment, the main-radio device displays the end of the command processing to the monitoring unit.

BRIEF DESCRIPTION OF THE DRAWINGS

Various example embodiments of the present invention are described in greater detail on the basis of Figures of the drawings, wherein the Figures show only example embodiments of the invention. Identical components in the Figures are provided with identical reference numbers. The drawings show.

DETAILED DESCRIPTION OF THE PREFERRED EMBODIMENTS

Different embodiments will now be described more fully hereinafter with reference to the accompanying drawings, whereby an approach for a radio-device system and a method, in which full functional capability, any error behavior and/or attempted manipulation of the main-radio device can be readily detected, is described. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
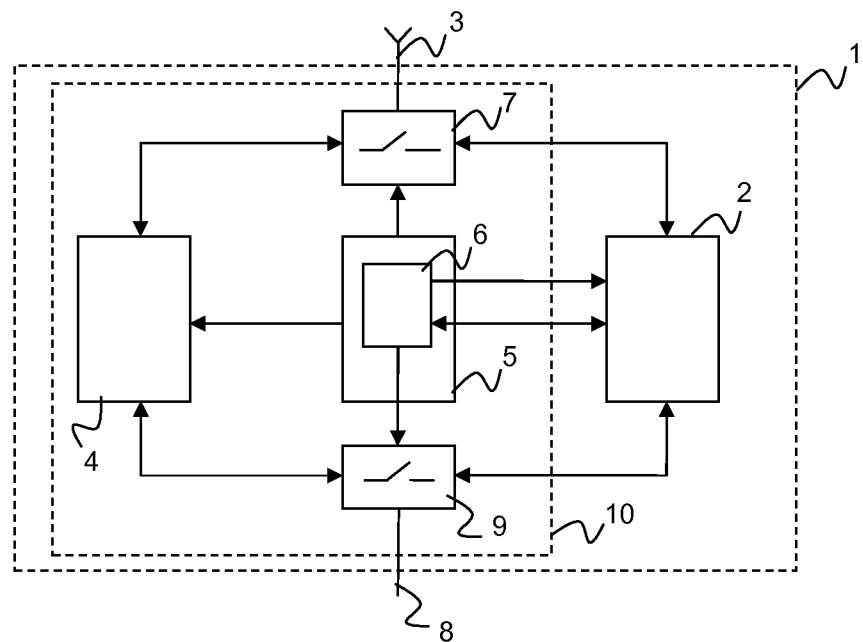
FIG. 1 a block-circuit diagram of a radio-device system according to example embodiments of the invention.

FIG. 1 illustrates a block-circuit diagram of a radio-device system 1 according to example embodiments of the invention. The radio-device system 1 comprises a main-radio device 2, an emergency-radio device 4 and a monitoring unit 5. The emergency-radio device 4 and the main-radio device 2 can be connected via an antenna switchover unit 7 to an antenna 3. Via a data interface 8, data can be connected by means of a data-interface switchover unit 9 either to the emergency-radio device 4 or the main-radio device 2. On the one hand, information to be transmitted is provided via the data interface 8 to the respective radio device 2, 4 or from the respective radio device 2, 4. On the other hand, commands are transmitted via the data interface 8 to the respective radio device 2, 4 in order to control the respective radio device 2, 4. The radio-device system 1 is used especially for aviation and/or shipping. Possible alternative uses are not excluded according to the invention.

The monitoring unit 5 is connected to the antenna-switchover unit 7 and also to the data-interface switchover unit 9 and controls the latter. The monitoring unit 5 further comprises a time-evaluation unit 6. The time-evaluation unit 6 is connected to the main-radio device 2 via a control line. The emergency-radio device 4, the monitoring unit 5, the antenna switchover unit 7 and also the data-interface switchover unit 9 are certified as a whole by an authorized certification authority.

In the following, according to example embodiments, the functioning of the radio-device system 1 is explained. Under normal conditions, a command is transmitted to the main-radio device 2 via the data interface 8 by means of the data-interface switchover unit 9. In particular, the command comprises instructions for control changes and status changes of the main-radio device 2. In particular, as exemplary commands, the radio-silence command, the jamming command and the key-deletion command are transmitted to the main-radio device via the data interface 8.

Now, in order to check whether these commands have brought about the desired status change of the main-radio device 2, a monitoring unit 5 is provided. According to embodiments of the invention, a time-evaluation unit 6 is integrated in the monitoring unit 5. By way of example, the evaluation unit 6 starts a time registration from the time at which a command is communicated to the main-radio device 2. After the processing of the command, the main-radio device 2 indicates the end of the command processing to the time-evaluation unit 6 within the monitoring unit 5. From this time, the time-evaluation unit stops the time registration and the time parameter is determined.

By way of further example, the time parameter is a predetermined time span which is adjusted in order to ensure that a command of the data interface 8 has been processed within a given time duration T, for example, 20 milliseconds, by the main-radio device 2, and a corresponding status of the main-radio device 2 has been changed. If the actually registered time span is greater than the predefined time span, this is interpreted by the monitoring unit 5 as an error.

Following this, the monitoring unit 5 transmits a control command to the antenna switchover unit 7, so that the readiness to transmit and the readiness to receive of the main-radio device 2 are suspended. The main-radio device 2 is accordingly deactivated. Following this, the emergency-radio device 4 is activated. Accordingly, a minimal functionality of the radio-device system 1 remains operational, especially, in order to be able to transmit a radio signal in the event of emergency. Furthermore, the security of the radio-device system 1 is increased, since security-relevant information, for example, cryptographic keys or identification parameters of the main-radio device 2, remain protected as a result of the deactivation of the main-radio device 4.

According to one embodiment, the emergency-radio device 4 provides a substantially reduced functionality by comparison with the main-radio device 2. In particular, effort-intensive encryption methods and waveform matching is not possible with the emergency-radio device 4.

By way of example, the internal functional units to be certified comprise an emergency-radio device 4, which provides a minimum functionality defined in a standard. Furthermore, the emergency-radio device 4 cooperates with several functional units of the region 10 to be certified, wherein these functional units can be supplemented by several functional units.

Figure 2:
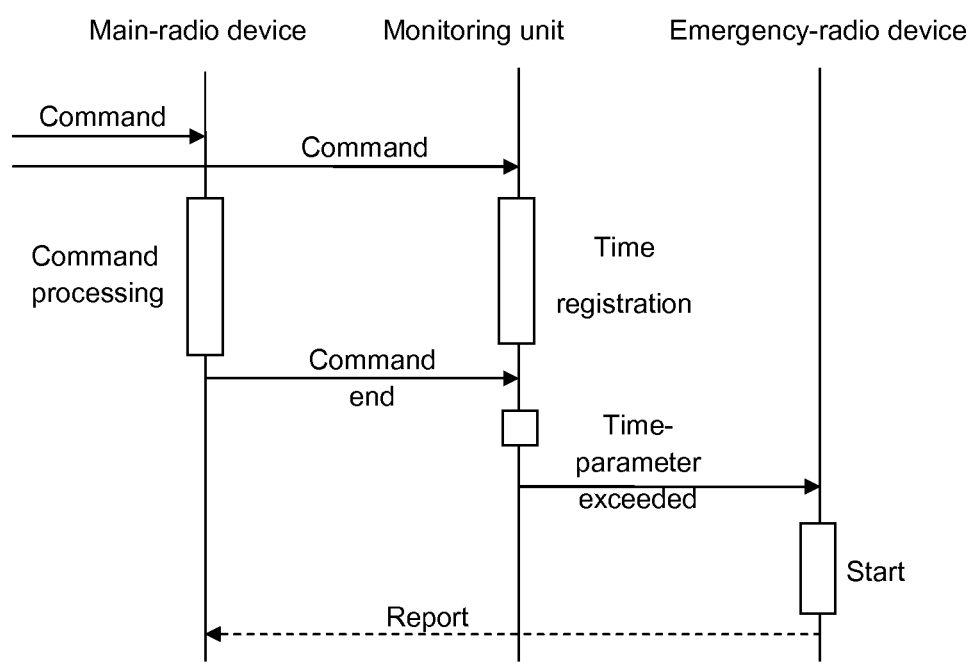
FIG. 2 a method flow diagram of a process for the activation of an emergency-radio device according to example embodiments of the invention.

FIG. 2 shows a method flow diagram for an activation of the emergency-radio device 4, according to example embodiments of the invention. In this context, the command to be implemented is transmitted via the data interface 8 to the main-radio device 2. The command is also provided to the monitoring unit 5. Such provision takes place either by means of the main-radio device 2 or alternatively via the data-interface unit 9. The command processing, from the time at which the monitoring unit 5 starts a time registration, is then implemented in the main-radio device 2. The main-radio device 2 signals to the monitoring unit 5 the end of the command processing. At this time, the monitoring unit 5 stops the time registration.

By way of example, the time registration is implemented according to the invention via a time-evaluation unit 6 within the monitoring unit 5. In the following step, the monitoring unit 5 analyses the registered time parameters and compares these time parameters with a predefined time span. If the result of this comparison is that the time parameter has been exceeded, the emergency-radio device 4 is activated, and the main-radio device 2 is deactivated. This takes place, in particular, via the switchover of the data-interface unit 9 and the antenna-switchover unit 7. As soon as the emergency-radio device 4 has been started, an acknowledgement signal is optionally transmitted to the main-radio device 2. From this time, a transmission of information by means of the main-radio device 2 is no longer possible, since the monitoring unit 5 has diagnosed an error because of the overshoot of the time parameter, and the main-radio device 2 has been deactivated.

By way of further example, as an alternative to the indication of the end of the command by the main-radio device 2, it is also possible for the monitoring unit 5 to control an automatic deactivation of the main-radio device 2 on the basis of the command received, as soon as a predefined time span has been exceeded. In such a case, a comparison between registered time span and predefined time span can be dispensed with.

Figure 3:
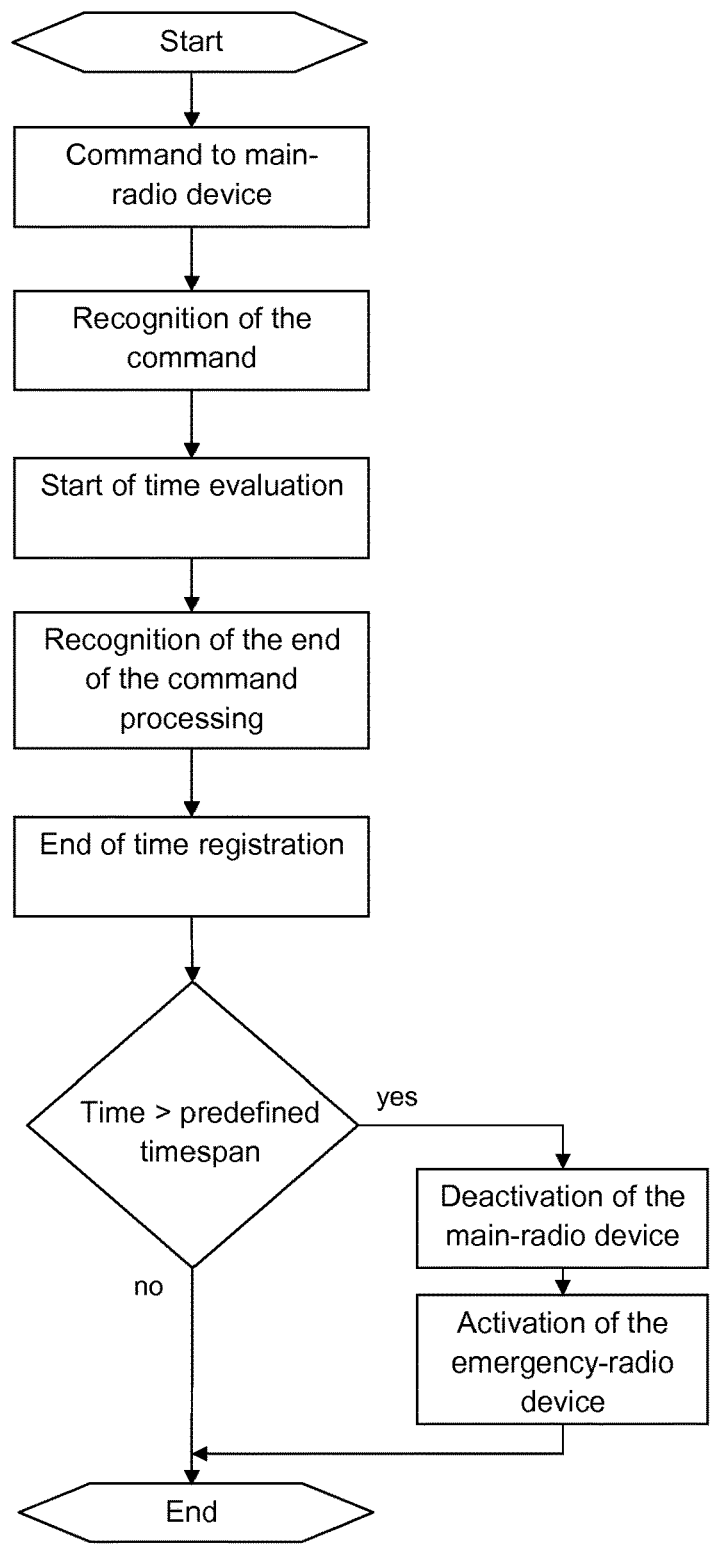
FIG. 3 a method flow diagram of a method according to example embodiments of the invention.

FIG. 3 shows a method flow diagram of a method according to example embodiments of the invention. In this context, a command is initially transmitted to the main-radio device 2. This command is recognized in the monitoring unit 5. Following this, a time-evaluation unit 6 starts a time evaluation. In the following step, the end of the command processing is recognized by the monitoring unit 5, whereupon the time registration by the time-evaluation unit 6 is terminated. The time-evaluation unit 6 now compares the registered time with a predefined time span. If the result of the comparison is that the registered time is greater than the predefined time span, the deactivation of the main-radio device 2 and the activation of the emergency-radio device 4 are implemented. Following this, the method is ended. If the predefined time span is greater than the registered time span the method is ended without the main-radio device 2 having been deactivated.

Figure 4:
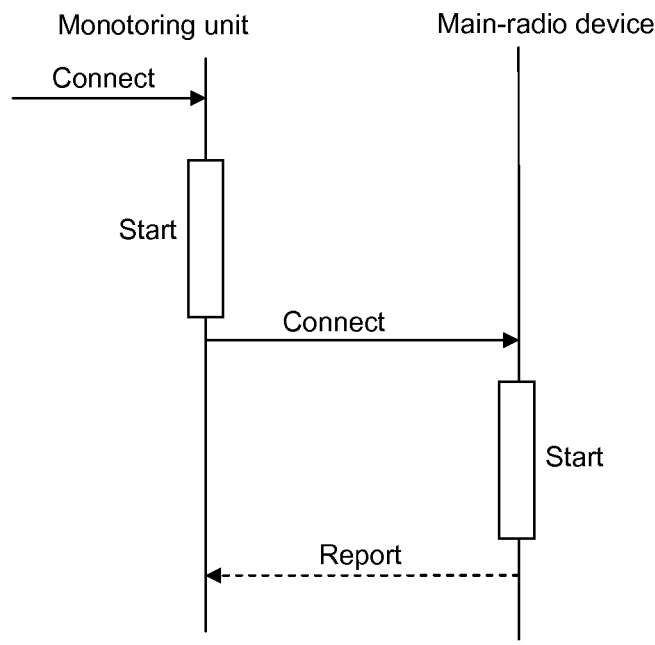
FIG. 4 a method flow diagram of a process for the sequential putting into service of the radio-device system according to example embodiments of the invention.
Figure 5:
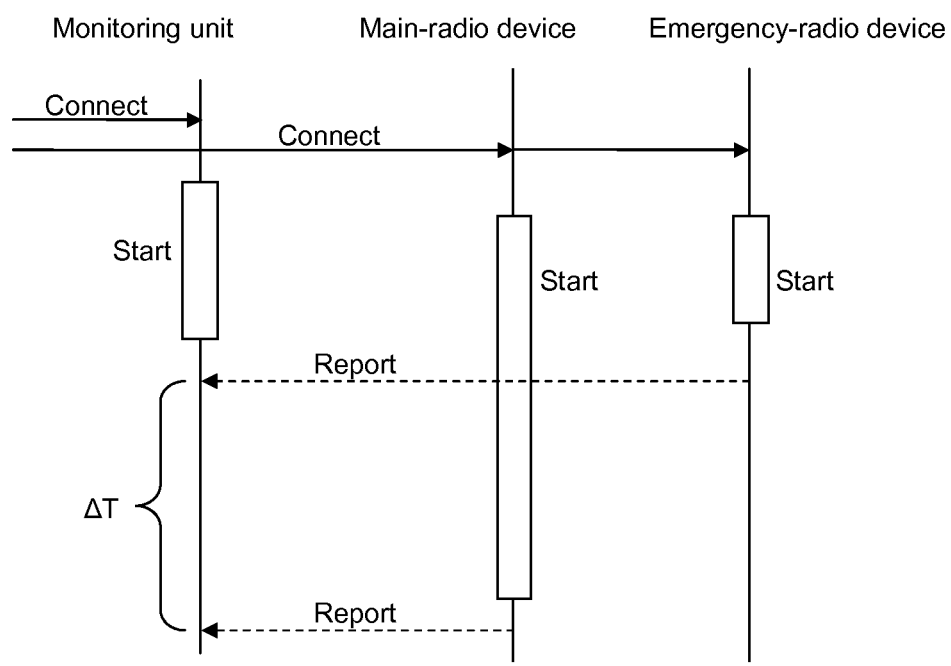
FIG. 5 a method flow diagram of a process for the parallel putting into service a of the radio-device system according to example embodiments of the invention.

FIGS. 4 and 5 show a boot-up process of the radio-device system 1, according to example embodiments of the invention. Accordingly, FIG. 4 illustrates a sequential boot-up example according of the radio-device system 1. A switch-on instruction 1 is received via the monitoring unit 5 in the radio-device system 1. The monitoring unit 5 then starts the emergency-radio device 4. If the emergency-radio device 4 is functional and ready for operation, the monitoring unit 5 transmits a switch-on command to the main-radio device 2. From this time, the main-radio device 2 is started. When the main-radio device has been started, an acknowledgement command is transmitted to the monitoring unit 5.

FIG. 5 shows a parallel boot-up for starting the radio-device system 1, as an alternative to that shown in FIG. 4. After the switch-on command via the data interface 8, the monitoring unit 5 and also the main-radio device 2 and the emergency-radio device 4 are started. Because of the complexity of the main-radio device 2, it is ready for operation only at a considerably later time than the emergency-radio device 4. Sometimes, however, the radio-device system 1 must be ready for operation before a vehicle, for example, an aircraft, a vessel, a land vehicle etc. can be moved. The relatively later time of readiness for operation then prevents a prompt movement of the vehicle. Accordingly, provision is preferably made that, from the time of readiness for operation of the emergency-radio device 4, the latter establishes the readiness for operation of the radio-device system 1. Accordingly, the emergency-radio device 4 takes over the radio transmissions of the radio-device system 1 until the complete boot-up of the main-radio device 2. Once the main-radio device 2 has been completely booted up, a report is transmitted to the monitoring unit 5, and the monitoring unit 5 causes the switchover of the radio-device system 1 to the main-radio device 2.

By way of example, the time span between the booted-up emergency-radio device 4 and the main-radio device 2 which is still to be started, is therefore used in order to achieve a basic functionality of the radio-device system 1. This is especially advantageous in the case of a so-called alarm start of an aircraft, because a readiness for operation of the radio-device system 1 is given from the time of the acknowledgement of the emergency-radio device 4, whereas, in the case of waiting until the main-radio device 2 is booted up, a time span T passes, which may, in some cases, last for several minutes.

Within the scope of the invention, all of the elements described and/or illustrated and/or claimed can be combined with one another arbitrarily. In particular, the device features and method features can be combined arbitrarily with one another.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio-device system with comprising:
a monitoring processor;
a main-radio device;
a data interface;
an emergency radio device; and
an antenna,
wherein the monitoring processor is connected to the main-radio device and to the emergency-radio device,
wherein the main-radio device is configured to receive a command via the data interface and to process the command,
wherein the monitoring processor is configured to receive the command, to monitor the processing of the command by the main-radio device, to receive an end of command processing signal, and to determine a registered time associated with the processing of the command by the main-radio device,
wherein the monitoring processor is configured to evaluate the registered time with regard to a time parameter, and
wherein the monitoring processor is configured to control the antenna to be connected either to the main-radio device or to the emergency-radio device based on the evaluation of the registered time with regard to the time parameter.

2. The radio-device system according to claim 1, wherein the time parameter is a pre-defined time duration.

3. The radio-device system according to claim 1, wherein the time parameter reflects a group delay time of the command, between a transmission of the command to the main-radio device and an end of the command processing by the main-radio device.

4. The radio-device system according to claim 1, wherein, in a case where the monitoring processor determines that the processing of a command violates the time parameter, the monitoring processor is configured to connect the antenna to the emergency-radio device.

5. The radio-device system according to claim 1, wherein the command is a radio-silence command.

6. The radio-device system according to claim 1, wherein the command is a key-deletion command.

7. The radio-device system according to claim 6, wherein, upon detection of the key-deletion command, the monitoring processor is configured to initiate a measurement for the key-deletion in the main-radio device.

8. The radio-device system according to claim 1, wherein, in a case where the command is a jamming command, the monitoring processor is configured to deactivate the main-radio device within its own transmission range.

9. The radio-device system according to claim 1, wherein the monitoring processor is configured to recognize a command falsification.

10. The radio-device system according to claim 1, wherein the monitoring processor is configured to recognize an opening of the main-radio device.

11. A method for monitoring processing of a command by a main-radio device of a radio-device system comprising:
receiving, by a monitoring processor of a radio device system, the command, wherein the command is received either directly or indirectly via a data interface of the radio device system;
monitoring, by the monitoring processor, the processing of the command by the main-radio device;
receiving, by the monitoring processor, an end of command processing signal;
determining, by the monitoring processor, a registered time associated with the processing of the command by the main-radio device;
evaluating, by the monitoring processor, the registered time with regard to a time parameter, and determining that the processing has violated the time parameter;
deactivating the main-radio device; and
activating an emergency-radio device.

12. The method according to claim 11, further comprising:
starting a time registration for the determination of the registered time upon receipt of the command by the main-radio device.

13. The method according to claim 12, further comprising:
ending the time registration upon completion of the command processing by the main-radio device.

14. The method according to claim 11, further comprising:
detecting an opening of the radio-device system;

wherein the deactivation of the main-radio device and the activation of the emergency-radio device are performed in response to the detection of the opening of the radio-device system.

15. The method according to claim 13, wherein the completion of the command processing is signaled by the main-radio device.

\* \* \* \* \*